TELEVISION RETRACE BLANKING CIRCUITS

Filed June 24, 1966 2 Sheets-Sheet 1

INVENTOR.
George A. Kent
BY Richard J. Waring
Pendleton, Neuman, Seibold & Williams
Attorneys INVENTOR.
George A. Kent
BY Richard J. Waring
Pendleton, Neuman, Seibold & Williams
Attorneys

United States Patent Office 3,507,994

Patented Apr. 21, 1970

3,507,994

TELEVISION RETRACE BLANKING CIRCUITS

George A. Kent, Fort Wayne, and Richard J. Waring, Auburn, Ind., assignors to The Magnavox Company, Fort Wayne, Ind., a corporation of Delaware Filed June 24, 1966, Ser. No. 560,230
Int. Cl. H04n 3/24
U.S. Cl. 178—7.5 11 Claims

ABSTRACT OF THE DISCLOSURE

A solid state circuit is disclosed for blanking a television picture tube during horizontal and vertical retrace intervals. In the specific embodiment described both a direct coupling from the horizontal deflection amplifier and a coupling including clipping means from the vertical deflection amplifier are provided to the video output amplifier to cut off the amplifier during retrace intervals, thus blanking the picture tube. The purpose of the clipping means is to prevent possible shading of the picture by ramp portions of the vertical deflection signal.

This invention relates to television retrace blanking circuits and more particularly to circuits for blanking a television picture tube during horizontal and vertical retrace time intervals. The circuits of this invention are relatively simple and straightforward in construction and operation and yet are highly reliable and trouble-free in operation while being effective to produce a high quality picture without distortions. The circuits use a minimum number of component parts and are relatively inexpensive.

The invention was evolved with the general object of providing a television receiver using transistors in the video amplifier and horizontal and vertical deflection circuits, and having circuitry effective to accomplish clean vertical and horizontal retrace blanking without distortion of the reproduced picture while being reliable in operation and while being relatively inexpensive in construction, using a minimum number of component parts.

In accordance with this invention, a television receiver is provided using a transistor in the output stage of a video amplifier, directly coupled to the electron gun of a picture tube and also using transistors in the output stages of the vertical and horizontal deflection circuits, directly coupled to the vertical and horizontal deflection coils for the picture tube. It is here noted that the term "transister" is used herein and in the claims in a generic sense to include conventional types of transistors and other types of solid state amplifier devices equivalent thereto and likewise, terms such as "base," "emitter" and "collector" are used in a generic sense to include equivalent forms of electrodes of solid state devices.

An important feature of the invention is in the provision of coupling means for applying retrace pulse portions of a sweep signal developed by the output transistor of a deflection circuit to the video output transistor in a manner to substantially cut off the video output transistor and blank the picture tube. Preferably and in accordance with a more specific feature of the invention, coupling means are provided between both horizontal and vertical output transistors and the video output transistor to accomplish both vertical and horizontal retrace blanking through the video output transistor stage.

Another feature of the invention is in the coupling of both the horizontal and vertical output transistors to a common electrode of the video output transistor, preferably with both coupling means including a series resistor.

Another very important feature of the invention is in the provision of clipping means arranged to apply only peak parts of retrace pulse portions of a sweep signal to the video output transistor. Preferably, the clipping means is in the form of a Zener diode connected in series between the deflection output transistor and the video output transistor. With the use of such clipping means, the effect of ramp portions of the sweep signal on the reproduced picture can be obviated. The ramp portion is a gradually changing portion of the sweep signal, effective to cause the traversing movement of the electron beam in the picture tube and if the ramp portion were applied to the video output stage, it would produce a very bad shading effect. The use of a Zener diode is particularly advantageous in that the clipping can be readily accomplished at the proper level in a transistorized circuit, while using direct coupling and while using a minimum number of parts.

The clipping feature could be used in conjunction with both vertical and horizontal retrace blanking but preferably is applied only in the vertical retrace blanking, the horizontal retrace blanking signal being superimposed upon the normal horizontal blanking pulse which is inherently provided in the video signal.

This invention contemplates other and more specific objects, features and advantages which will become more fully apparent from the following detailed description taken in conjunction with the accompanying drawings which illustrate a preferred embodiment and in which.

Figure 1:
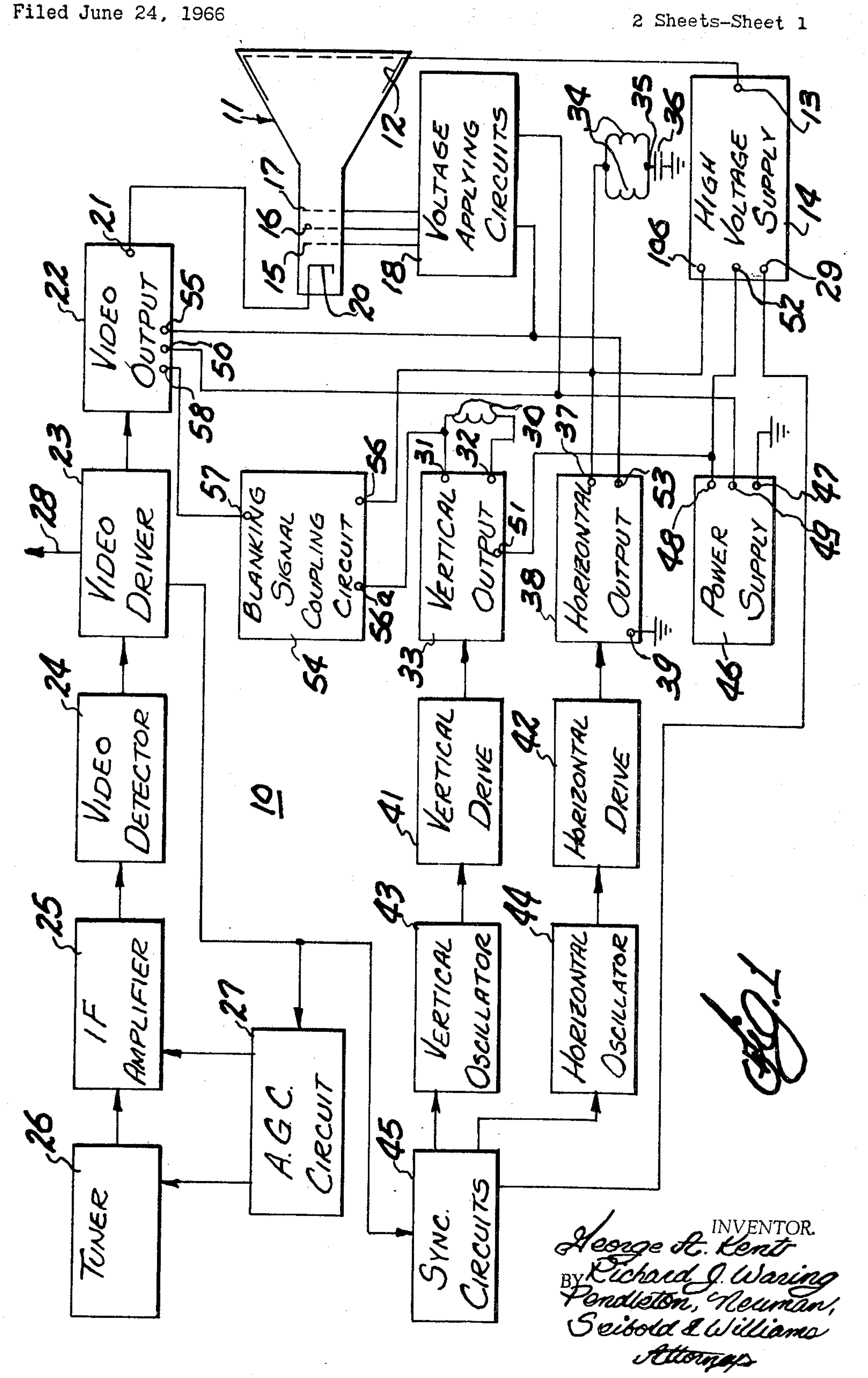
FIGURE 1 is a schematic block diagram of a television receiver constructed in accordance with the principles of this invention.

Reference numeral 10 generally designates a television receiver constructed in accordance with the principles of this invention. In general, the receiver 10 comprises a picture tube 11 having a screen 12 which is connected to an output terminal 13 of a high voltage transformer and rectifier circuit 14. The tube 11 has conventional electron gun structure for producing an electron beam to be impinged on the screen 12, including a control grid 15, an accelerating grid 16 and a focusing grid 17 connected to suitable voltage applying circuits 18. The electron gun further includes a cathode 20 connected to an output terminal 21 of a video output stage 22 which operates to apply an amplified video signal to the cathode 20 to control the intensity of the electron beam produced by the electron gun structure, and to thereby control the brightness of the spot produced on the screen 12.

The video output stage 22 receives a video signal from a video driver stage 23 which, in turn, receives a video signal from a video detector 24, the detector 24 being supplied with a signal from an IF amplifier 25 which receives a signal from a conventional tuner 26. An automatic gain control circuit 27 may be provided, which receives a signal from the video driver stage 23 and which applies gain control signals to the IF amplifier 25 and to the tuner 26. The video driver stage 23 may additionally apply a signal through a line 28 to a sound IF stage, coupled through suitable detector and amplifier circuits to a speaker for reproducing the audio portion of a received signal.

To effect vertical deflection of the beam in the picture tube 11, a pair of vertical deflection coils 30 are connected in series between a pair of output terminals 31 and 32 of a vertical output stage 33. To effect horizontal deflection of the beam, a pair of horizontal deflection coils 34 are connected in parallel between a circuit point 35 which is connected through a capacitor 36 to ground, and an output terminal 37 of a horizontal output stage 38 having a second output terminal 39 which is connected to ground.

The vertical and horizontal output stages 33 and 38 are supplied with signals from vertical and horizontal driver stages 41 and 42 which are supplied with signals from vertical and horizontal oscillator stages 43 and 44 to which synchronizing signals are applied from a synchronizing circuit 45, supplied with a signal from the video driver circuit 23 and also supplied with a signal from an output terminal 29 of the high voltage transformer and rectifier circuit 14.

A power supply 46 is provided, having a grounded terminal 47 and having a terminal 48 connected to a terminal 52 of the high voltage transformer and rectifier circuit 14 and to a terminal 51 of the vertical output stage 33. Another terminal 49 is connected to a terminal of the voltage applying circuits 18 and to a terminal 50 of the video output circuit 22. In addition, a power supply circuit may be incorporated in the horizontal output stage 38 having an output terminal 53 connected to a terminal of the voltage applying circuits 18 and to a terminal 55 of the video output circuit 22.

In accordance with this invention, the video output stage 22, the vertical output stage 33 and the horizontal output stage 38 are transistorized and a blanking signal coupling circuit 54 is provided having terminals 56*a* and 56 connected to output terminals 31 and 37 of the vertical and horizontal output stages 33 and 38 and having a terminal 57 connected to a terminal 58 of the video output stage 22 to cut off the video output stage 22 during retrace time intervals and to thereby blank the picture tube 11 during such intervals. The blanking signal coupling circuitry 54 and portions of the horizontal and vertical output circuits 33 and 38, as well as the high voltage transformer and rectifier circuit 14, are shown in the circuit diagram of FIGURE 2.

Figures 2, 3:
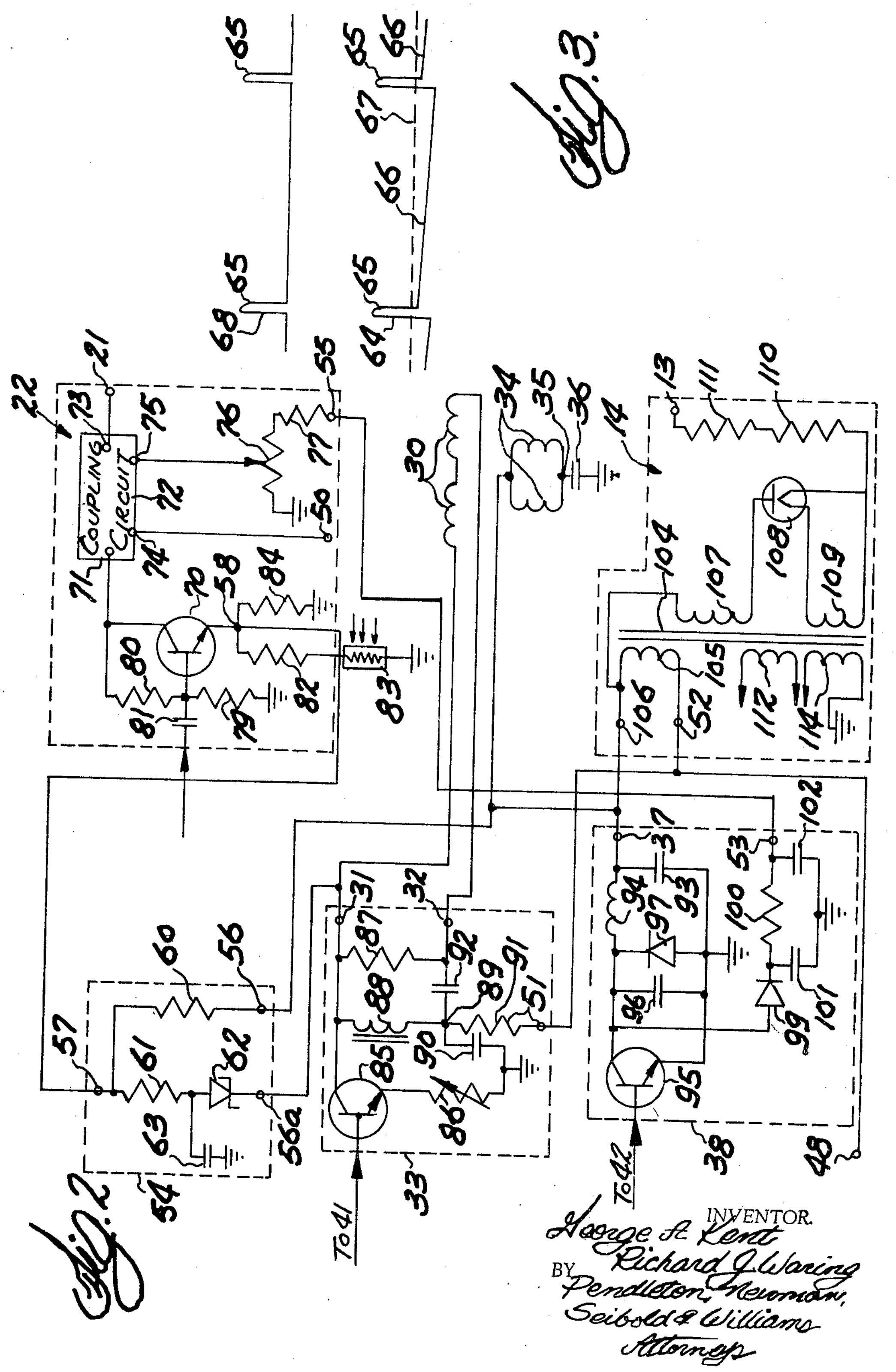
FIGURE 2 is a circuit diagram showing circuits of the receiver of FIGURE 1, including blanking signal coupling circuitry and portions of horizontal and vertical output stages and a high voltage transformer and rectifier circuit.
FIGURE 3 is a view showing waveforms for explanation of the operation of the circuits shown in FIGURE 2.

Referring to FIGURE 2, the blanking signal coupling circuit 54 comprises a resistor 60 connected in series between the terminals 56 and 57, to apply the horizontal sweep signal, developed at the output terminal 37 of the horizontal sweep circuit 38, to the terminal 58 of the video output stage 22. The horizontal sweep signal developed at the terimnal 37 includes retrace pulse portions of relatively large amplitude which are effective when applied through the resistor 60 to cut off the video output stage 22 and to blank the picture tube 11.

The blanking signal coupling circuit 54 further includes a resistor 61 which is connected in series between terminals 56*a* and 57 for applying the vertical sweep signal developed at terminal 31 of the vertical output stage 33 to the terminal 58 of the video output stage 22, for the purpose of cutting off the video output stage 22 and blanking the picture tube during retrace pulse portions of the vertical sweep signal.

A very important feature of the invention is in the provision of clipping means in the coupling circuit 54 arranged to apply only peak parts of the retrace pulse portions of the vertical sweep signal to the video output stage 22, to eliminate the effect of ramp portions of the sweep signal. Preferably, the clipping means is in the form of a Zener diode 62 connected in series with the resistor 61 between the terminals 56*a* and 57. The Zener diode 62 is reverse-biased to conduct only when the voltage thereacross exceeds a certain value. A capacitor 63 is preferably connected between ground and the junction between resistor 61 and Zener diode 62, to stabilize the operation. The effect of providing the clipping means in the form of the Zener diode 62 is illustrated in FIGURE 3, wherein reference numeral 64 generally indicates the waveform of the vertical sweep signal developed at the output terminal 31 of the vertical output stage 33. The sweep signal 64 includes retrace pulse portions 65, developed at the field rate (normally 60 per second) and relatively gradually changing ramp portions 66 between the retrace portions 65, the ramp portions being effective to cause the traversing movement of the electron beam in the picture tube 11 when applied to the deflection coils 30. If the ramp portions 66 were applied to the video output stage 22, it would produce a very bad shading effect. However, with the clipping means of this invention in the form of the Zener diode 62, only the peak parts of the retrace pulse portions 65 are applied to the video output stage 22, the signal being clipped at a level as indicated by dotted line 67 in FIGURE 3, to thereby produce a signal as indicated by reference numeral 68 in FIGURE 2, wherein the level is fixed between the retrace pulse portions 65. In a typical embodiment the total peak amplitude of the blanking pulses may be in the order of 200 volts, the ramp of the sweep may be of the order of 60 volts. A Zener having an inverse breakdown voltage in the order of 75 volts will thus be effective to provide a voltage offset and eliminate the ramp from the blanking signal.

According to a specific feature of the invention, the signals are applied to a common transistor electrode in the video output stage 22, preferably to the emitter of a transistor 70 to which terminal 58 is directly connected. The collector of the transistor 70 is connected to a terminal 71 of a coupling circuit 72 having a second terminal 73 connected to the terminal 21 which is connected directly to the cathode 20 of the picture tube 11, as shown in FIGURE 1. A third terminal 74 is connected to the terminal 50 for application of supply voltage to the transistor 70, while a fourth terminal 75 is connected to the movable contact of a potentiometer 76 having one terminal connected to ground and having a second terminal connected through a resistor 77 to the terminal 55, to which a voltage is applied from the power supply circuit incorporated in the horizontal output stage 38. The potentiometer 76 controls the level of DC voltage at the cathode of the picture tube, and thereby controls brightness.

The base of the transistor 70 is connected through a resistor 79 to ground, through a resistor 80 to the collector thereof and through a coupling capacitor 81 to the output of the video driver 23.

Although it does not constitute a feature of the invention by itself, it is noteworthy that the emitter of the transistor 70 is preferably connected to ground through a fixed resistor 82 and a variable resistor 83, variable resistor 83 being responsive to ambient light conditions and being effective to control the current through the transistor 70 to provide the proper brightness and contrast of the picture tube. A fixed resistor 84 is also preferably provided, connected between the emitter of transistor 70 and ground.

The output terminal 31 of the vertical output stage 33 is directly connected to the collector of a transistor 85 therein, having a base electrode connected to the output of the vertical drive circuit 41, and having an emitter connected through a variable resistor 86 to ground, the resistor 86 being effective as a height control. The collector of the transistor 85, together with the terminal 31 connected thereto, are connected through a resistor 87 to the terminal 32 and are also connected through an inductor 88 to a circuit point 89 which is connected through a capacitor 90 to ground, through a resistor 91 to the terminal 51 and through a capacitor 92 to the terminal 32. The capacitor 90 together with the resistor 91 operate as a decoupling filter while capacitor 92 blocks the application of a DC component of current to the vertical deflection coils 30.

In the horizontal output stage 38, terminal 37 is connected through a capacitor 93 to ground and through an inductor 94 to the collector of a transistor 95 having an emitter connected to ground and having a base connected to the output of the horizontal drive circuit 42. The collector of the transistor 95 is connected through a capacitor 96 and a damper diode 97 to ground and is additionally connected through a diode 99 and a resistor 100 to the terminal 53, opposite terminals of the resistor 100 being connected to ground through filter capacitors 101 and 102. Elements 99–102 form a power supply for developing a voltage at terminal 53 which may be on the order of 500 volts, for example.

The high voltage supply 14 comprises a transformer 104 having a primary winding 105 connected between terminal 52 and a terminal 106 which is connected to the output terminal 37 of the horizontal output stage 38. A secondary winding 107 of the transformer 104 is connected between terminal 106 and the anode of a high voltage rectifier tube 108 having a directly heated cathode connected to a winding 109 on the transformer 104 and connected through resistors 110 and 111 to the terminal 13 which is connected to the anode of the picture tube 11. An additional winding 112 may be provided on the transformer 104 for applying a signal to the automatic gain control circuit 27, and another winding 114 may be provided for supplying a signal to the synchronizing circuit 45.

This invention thus provides blanking circuits which are very simple and straightforward in construction and operation. The circuits are directly coupled to transistors in the output stages of vertical and horizontal deflection circuits which are directly coupled to horizontal and vertical deflection coils, and are for blanking purposes directly coupled to a transistor in the output stage of a video amplifier which is directly coupled to the electron gun of a picture tube.

By way of illustrative example and not by way of limitation, the principal components of the circuit of this invention may have the following values:

| Reference Numeral: | Value |
|---|---|
| 60 | 39,000 ohms. |
| 61 | 15,000 ohms. |
| 63 | 1000 picofarads. |
| 76 | 200,000 ohms. |
| 77 | 68,000 ohms. |
| 79 | 10,000 ohms. |
| 80 | 220,000 ohms. |
| 82 | 33 ohms. |
| 84 | 100 ohms. |
| 86 | 15 ohms. |
| 87 | 39,000 ohms. |
| 90 | 100 microfarads. |
| 91 | 22 ohms. |
| 92 | 250 microfarads. |
| 93 | 8200 picofarads. |
| 96 | 1000 picofarads. |

The video output transistor 70, the vertical output transistor 85 and the horizontal output transistor 95 may be of a conventional type. The supply voltage applied from terminal 48 may preferably be plus 68 volts, the voltage at terminal 53 may preferably be plus 500 volts, and the voltage at terminal 50 may preferably be plus 140 volts. With such types and values of components and with such operating voltages, a circuit is provided which is highly stable and reliable in operation and which accomplishes clean vertical and horizontal retrace blanking without distortion of the reproduced picture.

It will be understood that modifications and variations may be effected without departing from the spirit and scope of the novel concepts of this invention.

We claim as our invention:

1. In a television circuit including a picture tube having an electron gun and horizontal and vertical deflection coil means, a video detector, a video amplifier including a video output transistor, first coupling means for applying a video signal from said detector to said amplifier, second coupling means for applying an amplified video signal from said video output transistor to said electron gun, a deflection circuit including a deflection output transistor arranged to develop a periodic sweep signal having retrace pulse portions, third coupling means for applying said sweep signal from said deflection output transistor to one of said deflection means, and fourth coupling means for applying said retrace pulse portions of said sweep signal to said video output transistor independent of said video signal for substantially cutting off said video output transistor and blanking said picture tube.

2. In a television circuit including a picture tube having an electron gun and horizontal and vertical deflection coil means, a video amplifier including a video output transistor, first coupling means for applying an amplified video signal from said video output transistor to said electron gun, a first deflection circuit including a first deflection output transistor arranged to develop a first periodic sweep signal having retrace pulse portions, second coupling means for applying said first sweep signal from said first deflection output transistor to one of said deflection means, third coupling means for applying said retrace pulse portions of said first sweep signal to said video output transistor for substantially cutting off said video output transistor and blanking said picture tube, a second deflection circuit including a second deflection output transistor arranged to develop a second periodic sweep signal having retrace pulse portions, fourth coupling means for applying said second periodic sweep signal to the other of said deflection means, and fifth coupling means for applying said retrace pulse portions of said second periodic sweep signal to said video output transistor for substantially cutting off said video output transistor and blanking said picture tube.

3. In a television circuit as defined in claim 2, said video output transistor having an electrode connected to both of said third and fifth coupling means.

4. In a television circuit including a picture tube having an electron gun and horizontal and vertical deflection means, a video amplifier including a video output transistor, first coupling means for applying an amplified video signal from said video output transistor to said electron gun, a deflection circuit including a deflection output transistor arranged to develop a periodic sweep signal having retrace pulse portions and gradually sloping ramp portions between said retrace pulse portions, second coupling means for applying said sweep signal from said deflection output transistor to one of said deflection means, and third coupling means for applying said retrace pulse portions of said sweep signal to said video output transistor for substantially cutting off said video output transistor and blanking said picture tube and including clipping means arranged to apply only peak parts of said retrace pulse portions to said video output transistor to eliminate the effect of said ramp portions.

5. In a television circuit as defined in claim 4, said clipping means including a Zener diode connected in series between said deflection output transistor and said video output transistor.

6. In a television circuit including a picture tube having an electron gun and horizontal and vertical deflection coil means, a video amplifier including a video output transistor including a collector electrode and an emitter electrode, first coupling means connected to said collector electrode for applying an amplified video signal from said video output transistor to said electron gun, a deflection circuit including a deflection output transistor arranged to develop a periodic sweep signal having retrace pulse portions, second coupling means for applying said sweep signal from said deflection output transistor to one of said deflection means, and third coupling means connected to said emitter electrode for applying said retrace pulse portions of said sweep signal to said video output transistor for substantially cutting off said video output transistor and blanking said picture tube.

7. In a television circuit including a picture tube having an electron gun and horizontal and vertical deflection coil means, a video amplifier including a video output transistor, first coupling means for applying an amplified video signal from said video output transistor to said electron gun, a deflection circuit including a deflection output transistor arranged to develop a periodic sweep signal having retrace pulse portions, second coupling means for applying said sweep signal from said deflection output transistor to one of said deflection means, and third coupling means for applying said retrace pulse portions of said sweep signal to said video output transistor for substantially cutting off said video output transistor and blanking said picture tube, said deflection output transistor including a collector electrode connected to both said second and third coupling means.

8. In a television circuit as defined in claim 7, a second deflection circuit including a second deflection output transistor arranged to develop a second periodic sweep signal having retrace pulse portions, fourth coupling means for applying said said periodic sweep signal to the other of said deflection means, and fifth coupling means for applying said retrace pulse portions of said second periodic sweep signal to said video output transistor for substantially cutting off said video output transistor and blanking said picture tube, said second deflection output transistor including a collector electrode connected to both said fourth and fifth coupling means.

9. In a television circuit as defined in claim 3, each of said third and fifth coupling means including a series resistor.

10. In a television circuit as defined in claim 9, said fifth coupling means further including a Zener diode effective to apply only peak parts of said retrace pulse portions of said second sweep signal to said video output transistor.

11. In a television circuit including a picture tube having an electron gun and horizontal and vertical deflection coil means, a video amplifier including a video output transistor having base, emitter and collector electrodes and means for applying a video signal to said base electrode, first coupling means for applying an amplified video signal from said collector electrode to said electron gun, a horizontal deflection circuit including a horizontal output transistor having a collector electrode and arranged to develop at said collector electrode a horizontal sweep signal having retrace pulse portions, second coupling means for applying said horizontal sweep signal from said collector electrode of said horizontal output transistor to said horizontal deflection coil means, third coupling means including a series resistor connected between said collector electrode of said horizontal output transistor and said emitter electrode of said video output transistor for applying said retrace pulse portions of said horizontal sweep signal to substantially cut off said video output transistor and to blank said picture tube, a vertical deflection circuit including a vertical deflection output transistor having a collector electrode and arranged to develop at said collector electrode a vertical sweep signal having retrace pulse portions, fourth coupling means connected between said collector electrode of said vertical output transistor and said vertical deflection coil means, and fifth coupling means between said collector electrode of said vertical output transistor and said emitter electrode of said video output transistor, said fifth coupling means including a resistor and Zener diode connected in series.

References Cited

UNITED STATES PATENTS

| | | | |
|---|---|---|---|
| 2,950,346 | 8/1960 | Freedman et al. | |
| 3,005,929 | 10/1961 | Reichert | 315—30 |
| 3,090,889 | 5/1963 | Levinson | 315—20 |

ROBERT L. GRIFFIN, Primary Examiner

A. H. EDDLEMAN, Assistant Examiner

UNITED STATES PATENT OFFICE
CERTIFICATE OF CORRECTION

Patent No. 3,507,994 Dated April 21, 1970

Inventor(s) GEORGE A. KENT and RICHARD J. WARING

It is certified that error appears in the above-identified patent and that said Letters Patent are hereby corrected as shown below:

Column 7 (claim 8), line 17, "said" (second occurrence) should be --second--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—366-334